United States Patent
Wu et al.

(10) Patent No.: US 12,532,815 B2
(45) Date of Patent: Jan. 27, 2026

(54) METHOD FOR INDUCING FIELD-PLANTED ANANAS COMOSUS TO RAPIDLY PROPAGATE SEEDLINGS

(71) Applicant: HAINAN BETTER ECO-LEISURE AGRICULTURE TECHANOLOGY CO., LTD, Sanya (CN)

(72) Inventors: Junbei Wu, Sanya (CN); Yun Liu, Sanya (CN); Jiawen Wu, Zunyi (CN)

(73) Assignee: HAINAN BETTER ECO-LEISURE AGRICULTURE TECHANOLOGY CO., LTD, Sanya (CN)

( * ) Notice: Subject to any disclaimer, the term of this patent is extended or adjusted under 35 U.S.C. 154(b) by 0 days.

(21) Appl. No.: 19/222,970

(22) Filed: May 29, 2025

(65) Prior Publication Data

US 2025/0287880 A1  Sep. 18, 2025

Related U.S. Application Data

(63) Continuation of application No. PCT/CN2023/094048, filed on May 12, 2023.

(51) Int. Cl.

| | |
|---|---|
| A01G 7/06 | (2006.01) |
| A01C 21/00 | (2006.01) |
| A01G 2/00 | (2018.01) |
| A01G 2/10 | (2018.01) |
| A01G 22/05 | (2018.01) |
| A01N 47/24 | (2006.01) |
| A01N 47/32 | (2006.01) |
| A01N 57/10 | (2006.01) |
| A01N 57/20 | (2006.01) |

(52) U.S. Cl.
CPC .............. *A01G 7/06* (2013.01); *A01C 21/005* (2013.01); *A01G 2/00* (2018.02); *A01G 22/05* (2018.02); *A01N 47/24* (2013.01); *A01N 47/32* (2013.01); *A01N 57/10* (2013.01); *A01N 57/20* (2013.01)

(58) Field of Classification Search
CPC . A01G 7/06; A01G 2/00; A01G 22/05; A01G 2/10; A01C 21/005
See application file for complete search history.

(56) References Cited

U.S. PATENT DOCUMENTS 3,683,550 A   8/1972   Corlett, Jr. et al.

FOREIGN PATENT DOCUMENTS

| CN | 106688560 A | | 5/2017 | |
|---|---|---|---|---|
| CN | 109122108 A | | 1/2019 | |
| CN | 115039590 A | | 9/2022 | |
| CN | 115623963 A | * | 1/2023 | ............. A01G 22/05 |
| JP | 2007252305 A | | 10/2007 | |

OTHER PUBLICATIONS

Internation Search Report of PCT/CN2023/094048, Mailed Jul. 25, 2023.
Zhao, Wenzhen et al., "Study on Chlorflurenol-Methyl Combined with Ethephon to Induce Buds and Propagate Pineapples", South China Fruits, vol. 25, No. 04, Jul. 20, 1996, pp. 30-31.
Sun, Weisheng et al., "The Rapid Propagation Technology of Bud Mutation from Pineapple Plant", Guangxi Horticulture, vol. 18, No. 03, May 20, 2007, 24-25, entire document.
Chen, Chengjie et al., "Production and Research of Pineapples in Japan", South China Fruits, vol. 41, No. 04, Jul. 20, 2012, 128-132.
Ke, Lidong et al., "Propagation and Breeding of Ornamental Pineapples", China Flowers & Horticulture, No. 10, May 15, 2008, 17-19, entire document.

* cited by examiner

*Primary Examiner* — Kristen C Hayes

(57) ABSTRACT

Disclosed is a method for inducing field-planted *Ananas comosus* to rapidly propagate seedlings, which adopts a new technical management method for practical production of the field-planted *Ananas comosus,* and comprises: pruning and shaping mother plants of *Ananas comosus,* performing sterilization and pest prevention on the mother plants of *Ananas comosus,* promoting germination, performing fertilization, and propagating and culturing strong seedlings, especially implementing application management of plant kinetin, so that a seedling propagation period of the field-planted *Ananas comosus* is shortened by more than 60 days compared with a natural propagation period, and by means of 2-3 rounds of propagation and harvesting, a propagation coefficient of a single mother plant is improved to reach 12. The method has a high propagation rate, realizes rapid production of a large number of native offset seedlings of *Ananas comosus,* and greatly improves the production efficiency of *Ananas comosus,* and reduces a seedling propagation cost.

1 Claim, No Drawings

METHOD FOR INDUCING FIELD-PLANTED ANANAS COMOSUS TO RAPIDLY PROPAGATE SEEDLINGS

CROSS-REFERENCE TO RELATED APPLICATIONS

This application is a continuation of International Patent Application No. PCT/CN2023/094048 with a filing date of May 12, 2023, designating the United States, now pending, and further claims priority to Chinese Patent Application No. 202211646078. 1 with a filing date of Dec. 21, 2022. The content of the aforementioned applications, including any intervening amendments thereto, are incorporated herein by reference.

TECHNICAL FIELD

The present invention belongs to the technical field of plant propagation, and is particularly a method for inducing field-planted *Ananas comosus* to rapidly propagate seedlings.

BACKGROUND OF THE PRESENT INVENTION

*Ananas comosus* (*Ananas comosus* (L.) Merr.), also known as pineapple, is an important economic crop in tropical and subtropical ecological regions around the world, which is widely planted in Hainan, Yunnan, Guangdong, Guangxi, Fujian and other provinces in China, and is one of the most important tropical fruit varieties in international trade of agricultural products. In general, the propagation and production of the *Ananas comosus* refers to the natural growth offset seedlings or the vegetative propagation and production of factory tissue culture. A propagation coefficient of offsets of natural plants is low, each plant produces 2 to 3 offsets in the same period, and it takes about 4 months to produce a batch of seedlings, so that a growth period is long, which seriously affects the production efficiency of the *Ananas comosus*. Although a large number of seedlings may be propagated in the same batch by tissue culture propagation, the defects of huge investment in propagation equipment and factories, complicated procedures, high professional and technical requirements, and more than 14 months of cultivation period which is too long seriously hinder the planting efficiency of the *Ananas comosus* and cause a huge waste of production cost.

SUMMARY OF THE PRESENT INVENTION

Technical Problem

The present invention provides an actual production method for rapidly propagating seedlings of field-planted *Ananas comosus*, which overcomes the defects of the above problems, and greatly improves a propagation coefficient in the same production period and natural state, wherein a yield of a single plant reaches 10 to 12 seedlings, and a time period for producing a single batch of seedlings from the same mother plant is about 30 days ahead of schedule; and the method has strong practicability, is simple and fast to operate, has a high single-plant propagation coefficient, and solves the problems of low natural propagation coefficient, long period and tissue culture production period, high professional and technical requirements, and excessively high cost on factory equipment.

Technical Solution

The present invention adopts the following technical solution: a method for rapidly propagating field-planted *Ananas comosus* comprises the following steps:

first step: propagating mother plants of *Ananas comosus* and pruning leaves, wherein the leaves are pruned after picking fruits of the field-planted *Ananas comosus*, a lower leaf tip part is pruned perpendicular to a leaf direction, and a leaf base with a length of 25 cm to 30 cm is reserved, so as to ensure that rain and dew water is reserved at the leaf base to facilitate pesticide and fertilizer irrigation management in a later stage, and ensure full ventilation and sunlight reception to facilitate field management and seedling harvesting in the later stage;

second step: performing sterilization and pest prevention on the mother plants of *Ananas comosus*, and promoting germination, wherein materials comprising 70% thiophanate methyl wettable powder or 25% carbendazim wettable powder, 90% trichlorfon soluble powder, potassium dihydrogen phosphate and 40% ethephon are prepared for later use; and a specific implementing method is as follows: (1) at a temperature less than 26° C. in an afternoon, 145 g of 70% thiophanate methyl wettable powder or 250 g of 25% carbendazim wettable powder, 200 g of potassium dihydrogen phosphate and 300 g of 90% trichlorfon soluble powder are prepared for every 100 kg of water; and 2 L of warm water at a water temperature of 45° C. is prepared first to fully dissolve trichlorfon in advance and then added into 100 kg of water and evenly stirred, then the mixture is added with 200 g of potassium dihydrogen phosphate and fully dissolved and evenly stirred, then the mixture is added with the thiophanate methyl wettable powder or carbendazim wettable powder and evenly stirred, the solution is prepared for current use and sprayed on the pruned plants of *Ananas comosus* to fully wet the whole plants until a small amount of water is accumulated under leaf axils, and the sterilization and pest prevention are performed; and (2) after 7 days, at a temperature less than 26° C. in a sunshineless evening, the solution is diluted by 800 times with 40% ethephon, and sprayed on the whole mother plants of *Ananas comosus* until front and back leaves are wet through;

third step: performing fertilization, and propagating and culturing strong seedlings, wherein water and a fertilizer are supplemented according to integration of water and fertilizer, (1) a 100-fold water and fertilizer solution is prepared with a water-soluble compound fertilizer at a N:P:K ratio of 20:10:15, root-irrigation fertilization is performed according to 800 ml per plant, and after 3 hours, a humidity of about 40% around roots is measured; and (2) after 30 days, second root-irrigation fertilization is performed according to the method in the step (1);

fourth step: promoting bud differentiation and growth, wherein first spraying of the step is started on a 10$^{th}$ day after completing the second step, (1) 15 g of cytokinin is fully dissolved with 100 ml of 0.1 mol/L hydrochloric acid and then added into 100 kg of water and evenly stirred, the mixture is compounded with 0.2% urea and compounded with 0.2% potassium dihydrogen phosphate, evenly stirred and fully dissolved, and then sprayed on the whole plants until a small amount of water accumulated under leaf axils; and (2) after 15 days, second spraying is performed by the same proportion and method;

fifth step: promoting growth of strong offset seedlings of Ananas comosus, wherein, 20 days after completing the spraying in the step (2) in the fourth step, multiple offsets exposed under multiple leaf axils are seen, and the growth of the strong seedlings is promoted at the time, (1) a 1000-fold solution prepared with 4% gibberellic acid emulsifiable concentrate is sprayed on the whole mother plants once, after 3 days, an aqueous solution is compounded by using a 100-fold water-soluble compound fertilizer at a N:P:K ratio of 20:10:15 and 1000-fold mineral potassium fulvate, and at a temperature less than 26° C. in an afternoon, 600 ml of the solution is poured from tops of the mother plants to ensure that water is accumulated under leaf axils; and (2) after 15 days, the solution is poured again by the above method; and after 45 days of culture, the mother plants produce 3-5 offset seedlings with a length of 20-30 cm required in planting, and the seedlings are harvested; and sixth step: after the first seedling harvesting, implementing operations as follows: (1) the second step to the fifth step are repeated in a first round, so that second seedling production and propagation is performed until seedlings in the second production and propagation are harvested, and a seedling yield of a single mother plant is multiplied for the first time; and (2) the second step to the fifth step are repeated in a second round by the method until seedlings in third production and propagation are harvested; and through three rounds of cultivation, a total seedling production coefficient of the single mother plant reaches 10-12, so that the seedlings are rapidly propagated, and species groups are expanded.

Beneficial Effects

The present invention aims to provide the method for inducing the field-planted Ananas comosus to rapidly propagate the seedlings, so that a seedling propagation period of the field-planted Ananas comosus is shortened by more than 60 days compared with a natural propagation period, and by means of 2-3 rounds of propagation and harvesting, a propagation coefficient of a single mother plant is improved to reach 12. The method has a high propagation rate, and can realize rapid production of a large number of native offset seedlings of Ananas comosus, and the technology is used for practical production on a farmland, improves the production efficiency of Ananas comosus, shortens a seedling production period, reduces a seedling propagation cost, and realizes rapid propagation and production of the seedlings of Ananas comosus.

DETAILED DESCRIPTION OF PREFERRED EMBODIMENTS

The present invention is further described hereinafter with reference to specific embodiments, but the scope of the present invention is not limited to examples, and the scope of protection claimed is recorded in the claims.

Embodiment

In this embodiment, a method for rapidly propagating field-planted Ananas comosus comprises the following steps:

first step: propagating mother plants of Ananas comosus and pruning leaves, wherein the leaves are pruned after picking fruits of the field-planted Ananas comosus, a lower leaf tip part is pruned perpendicular to a leaf direction, and a leaf base with a length of 25 cm to 30 cm is reserved, so as to ensure that rain and dew water is reserved at the leaf base to facilitate pesticide and fertilizer irrigation management in a later stage, and ensure full ventilation and sunlight reception to facilitate field management and seedling harvesting in the later stage;

second step: performing sterilization and pest prevention on the mother plants of Ananas comosus, and promoting germination, wherein materials comprising 70% thiophanate methyl wettable powder, 90% trichlorfon soluble powder, potassium dihydrogen phosphate and 40% ethephon are prepared for later use; and a specific implementing method is as follows: (1) at a temperature of 25° C. in an afternoon, 145 g of 70% thiophanate methyl wettable powder, 200 g of potassium dihydrogen phosphate and 300 g of 90% trichlorfon soluble powder are prepared for every 100 kg of water; and 2 L of warm water at a water temperature of 45° C. is prepared first to fully dissolve trichlorfon in advance and then added into 100 kg of water and evenly stirred, then the mixture is added with 200 g of potassium dihydrogen phosphate and fully dissolved and evenly stirred, then the mixture is added with 250 g of thiophanate methyl wettable powder and evenly stirred, the solution is prepared for current use and sprayed on the pruned plants of Ananas comosus to fully wet the whole plants until a small amount of water is accumulated under leaf axils, and the sterilization and pest prevention are performed; and (2) after 7 days, at a temperature of 25° C. in a sunshineless evening, the solution is diluted by 800 times with 40% ethephon, and sprayed on the whole mother plants of Ananas comosus until front and back leaves are wet through;

third step: performing fertilization, and propagating and culturing strong seedlings, wherein water and a fertilizer are supplemented according to integration of water and fertilizer, (1) a 100-fold water and fertilizer solution is prepared with a water-soluble compound fertilizer at a N:P:K ratio of 20:10:15, root-irrigation fertilization is performed according to 800 ml per plant, and after 3 hours, a humidity of about 40% around roots is measured; and (2) after 30 days, second root-irrigation fertilization is performed according to the method and proportion in the step (1);

fourth step: promoting bud differentiation and growth, wherein first spraying of the step is started on a $10^{th}$ day after completing the second step, (1) 15 g of cytokinin is fully dissolved with 100 ml of 0.1 mol/L hydrochloric acid and then added into 100 kg of water and evenly stirred, the mixture is compounded with 0.2% urea and compounded with 0.2% potassium dihydrogen phosphate, evenly stirred and fully dissolved, and then sprayed on the whole plants until a small amount of water accumulated under leaf axils; and (2) after 15 days, second spraying is performed by the same proportion and method;

fifth step: promoting growth of strong offset seedlings of Ananas comosus, wherein, 20 days after completing the spraying in the step (2) in the fourth step, multiple offsets exposed under multiple leaf axils are seen, and the growth of the strong seedlings is promoted at the time, (1) a 1000-fold solution prepared with 4% gibberellic acid emulsifiable concentrate is sprayed on the whole mother plants once, after 3 days, an aqueous solution is compounded by using a 100-fold water-soluble compound fertilizer at a N:P:K ratio of 20:10:15 and 1000-fold mineral potassium fulvate, and at a temperature of 25° C. in an afternoon, 600 ml of the solution is poured from tops of the mother plants to ensure that water is accumulated under leaf axils; and (2) after 15 days, the solution is poured again by the above method; and after 45 days of culture, the mother plants produce 3-4 offset seedlings with a length of 20-30 cm required in planting, and the seedlings are harvested; and sixth step: after the first seedling harvesting, implementing operations as follows: (1) the second step to the fifth step are repeated in a first round, so that second seedling production and propagation is performed until seedlings in the second production and propagation are harvested, and a seedling yield of a single mother plant is multiplied for the first time; and (2) the second step to the fifth step are repeated in a second round by the method until seedlings in third production and propagation are harvested; and through three rounds of cultivation, a total seedling production coefficient of the single mother plant reaches 11, so that the seedlings are rapidly propagated, and species groups are expanded.

EMBODIMENTS OF THE PRESENT INVENTION

In this embodiment, a method for rapidly propagating field-planted *Ananas comosus* comprises the following steps:

first step: propagating mother plants of *Ananas comosus* and pruning leaves, wherein the leaves are pruned after picking fruits of the field-planted *Ananas comosus,* a lower leaf tip part is pruned perpendicular to a leaf direction, and a leaf base with a length of 25 cm to 30 cm is reserved, so as to ensure that rain and dew water is reserved at the leaf base to facilitate pesticide and fertilizer irrigation management in a later stage, and ensure full ventilation and sunlight reception to facilitate field management and seedling harvesting in the later stage;

second step: performing sterilization and pest prevention on the mother plants of *Ananas comosus,* and promoting germination, wherein materials comprising 25% carbendazim wettable powder, 90% trichlorfon soluble powder, potassium dihydrogen phosphate and 40% ethephon are prepared for later use; and a specific implementing method is as follows: (1) at a temperature of 25° C. in an afternoon, 250 g of 25% carbendazim wettable powder, 200 g of potassium dihydrogen phosphate and 300 g of 90% trichlorfon soluble powder are prepared for every 100 kg of water; and 2 L of warm water at a water temperature of 45° C. is prepared first to fully dissolve trichlorfon in advance and then added into 100 kg of water and evenly stirred, then the mixture is added with 200 g of potassium dihydrogen phosphate and fully dissolved and evenly stirred, then the mixture is added with the prepared carbendazim wettable powder and evenly stirred, the solution is prepared for current use and sprayed on the pruned plants of *Ananas comosus* to fully wet the whole plants until a small amount of water is accumulated under leaf axils, and the sterilization and pest prevention are performed; and (2) after 7 days, at a temperature less than 25° C. in a sunshineless evening, the solution is diluted by 800 times with 40% ethephon, and sprayed on the whole mother plants of *Ananas comosus* until front and back leaves are wet through;

third step: performing fertilization, and propagating and culturing strong seedlings, wherein water and a fertilizer are supplemented according to integration of water and fertilizer, (1) a 100-fold water and fertilizer solution is prepared with a water-soluble compound fertilizer at a N:P:K ratio of 20:10:15, root-irrigation fertilization is performed according to 800 ml per plant, and after 3 hours, a humidity of about 40% around roots is measured; and (2) after 30 days, second root-irrigation fertilization is performed according to the method and proportion in the step (1);

fourth step: promoting bud differentiation and growth, wherein first spraying of the step is started on a $10^{th}$ day after completing the second step, (1) 15 g of cytokinin is fully dissolved with 100 ml of 0.1 mol/L hydrochloric acid and then added into 100 kg of water and evenly stirred, the mixture is compounded with 0.2% urea and compounded with 0.2% potassium dihydrogen phosphate, evenly stirred and fully dissolved, and then sprayed on the whole plants until a small amount of water accumulated under leaf axils; and (2) after 15 days, second spraying is performed by the same proportion and method;

fifth step: promoting growth of strong offset seedlings of *Ananas comosus,* wherein, 20 days after completing the spraying in the step (2) in the fourth step, multiple offsets exposed under multiple leaf axils are seen, and the growth of the strong seedlings is promoted at the time, (1) a 1000-fold solution prepared with 4% gibberellic acid emulsifiable concentrate is sprayed on the whole mother plants once, after 3 days, an aqueous solution is compounded by using a 100-fold water-soluble compound fertilizer at a N:P:K ratio of 20:10:15 and 1000-fold mineral potassium fulvate, and at a temperature of 25° C. in an afternoon, 600 ml of the solution is poured from tops of the mother plants to ensure that water is accumulated under leaf axils; and (2) after 15 days, the solution is poured again by the above method; and after 45 days of culture, the mother plants produce 4-5 offset seedlings with a length of 20-30 cm required in planting, and the seedlings are harvested; and sixth step: after the first seedling harvesting, implementing operations as follows: (1) the second step to the fifth step are repeated in a first round, so that second seedling production and propagation is performed until seedlings in the second production and propagation are harvested, and a seedling yield of a single mother plant is multiplied for the first time; and (2) the second step to the fifth step are repeated in a second round by the method until seedlings in third production and propagation are harvested; and through three rounds of cultivation, a total seedling production coefficient of the single mother plant reaches 12, so that the seedlings are rapidly propagated, and species groups are expanded.

INDUSTRIAL APPLICABILITY

The present invention belongs to the technical field of plant cultivation and propagation, and discloses a method for inducing field-planted *Ananas comosus* to rapidly propagate seedlings, which adopts a new technical management method for practical production of the field-planted *Ananas comosus*, and comprises: pruning and shaping mother plants of *Ananas comosus*, performing sterilization and pest prevention on the mother plants of *Ananas comosus*, promoting germination, performing fertilization, and propagating and culturing strong seedlings, especially implementing application management of plant kinetin, so that a seedling propagation period of the field-planted *Ananas comosus* is shortened by more than 60 days compared with a natural propagation period, and by means of 2-3 rounds of propagation and harvesting, a propagation coefficient of a single mother plant is improved to reach 12. The method has a high propagation rate, and can realize rapid production of a large number of native offset seedlings of *Ananas comosus*, and the technology is used for practical production on a farmland, improves the production efficiency of *Ananas comosus*, and reduces a seedling propagation cost.

FREE CONTENTS OF SEQUENCE TABLE

*Ananas comosus*, also known as pineapple, is an important economic crop in tropical and subtropical ecological regions around the world, and is one of the most important tropical fruit varieties in international trade of agricultural products. In general, the propagation and production of the *Ananas comosus* refers to the natural growth offset seedlings or the vegetative propagation and production of factory tissue culture. A propagation coefficient of offsets of natural plants is low, each plant produces 2 to 3 offsets in the same period, and it takes 3 to 4 months to produce a batch of seedlings, so that a growth period is long, which seriously affects the production efficiency of the *Ananas comosus*. Although a large number of seedlings may be propagated in the same batch by tissue culture propagation, the defects of huge investment in propagation equipment and factories, complicated procedures, high professional and technical requirements, and more than 14 months of cultivation period, which is too long, seriously hinder the planting efficiency of the *Ananas comosus* and cause a huge waste of production cost. The invention belongs to the technical field of plant cultivation and propagation, and discloses a method for inducing field-planted *Ananas comosus* to rapidly propagate seedlings, which adopts a new technical management method for practical production of the field-planted *Ananas comosus*, and comprises: pruning and shaping mother plants of *Ananas comosus*, performing sterilization and pest prevention on the mother plants of *Ananas comosus*, promoting germination, performing fertilization, and propagating and culturing strong seedlings, especially implementing application management of plant kinetin, so that a seedling propagation period of the field-planted *Ananas comosus* is shortened by more than 60 days compared with a natural propagation period, and by means of 2-3 rounds of propagation and harvesting, a propagation coefficient of a single mother plant is improved to reach 12. The method has a high propagation rate, and can realize rapid production of a large number of native offset seedlings of *Ananas comosus*, and the technology is used for practical production on a farmland, improves the production efficiency of *Ananas comosus*, and reduces a seedling propagation cost.

We claim:

1. A method for inducing field-planted *Ananas comosus* to rapidly propagate seedlings, specifically comprising the following steps:

first step: propagating mother plants of *Ananas comosus* and pruning leaves, wherein the leaves are pruned after picking fruits of the field-planted *Ananas comosus*, a lower leaf tip part is pruned perpendicular to a leaf direction, and a leaf base with a length of 25 cm to 30 cm is reserved, so as to ensure that rain and dew water is reserved at the leaf base to facilitate pesticide and fertilizer irrigation management in a later stage, and ensure full ventilation and sunlight reception to facilitate field management and seedling harvesting in a later stage;

second step: performing sterilization and pest prevention on the mother plants of *Ananas comosus*, and promoting germination, wherein materials comprising 70% thiophanate methyl wettable powder or 25% carbendazim wettable powder, 90% trichlorfon soluble powder, potassium dihydrogen phosphate and a solution with 40% ethephon are prepared for later use; and a specific implementing method is as follows: (1) at a temperature less than 26° C. in an afternoon, 145 g of 70% thiophanate methyl wettable powder or 250 g of 25% carbendazim wettable powder, 200 g of potassium dihydrogen phosphate and 300 g of 90% trichlorfon soluble powder are prepared for every 100 kg of water; and 2 L of warm water at a water temperature of 45° C. is prepared first to fully dissolve trichlorfon in advance and then added into 100 kg of water and evenly stirred to obtain a mixture, then the mixture is added with 200 g of potassium dihydrogen phosphate and fully dissolved and evenly stirred, then the mixture is added with 250 g of thiophanate methyl wettable powder or carbendazim wettable powder and evenly stirred to obtain a solution, the solution is prepared for current use and sprayed on the mother plants of *Ananas comosus* after pruning to fully wet the mother plants until water is accumulated under leaf axils, and the sterilization and pest prevention are performed; and (2) after 7 days, at a temperature less than 26° C. in a sunshineless evening, the solution with 40% ethephon is diluted by 800 times, and sprayed on the mother plants of *Ananas comosus* fully until front and back leaves are wet through;

third step: performing fertilization, and propagating and culturing seedlings, wherein water and a fertilizer are supplemented according to integration of water and fertilizer, (1) a first root-irrigation fertilization: a 100-fold water and fertilizer solution is prepared with a water-soluble compound fertilizer at a N:P:K ratio of 20:10:15, root-irrigation fertilization is performed according to 800 ml per plant, until a humidity of 40% around roots is reached after 3 hours; and (2) after 30 days, a second root-irrigation fertilization that is same as the first root-irrigation fertilization is performed;

fourth step: promoting bud differentiation and growth, wherein a first spraying is started on a $10^{th}$ day after completing the second step, (1) 15 g of cytokinin is fully dissolved with 100 ml of 0.1 mol/L hydrochloric acid and then added into 100 kg of water and evenly stirred to obtain another mixture, the other mixture is compounded with 0.2% urea and compounded with 0.2% potassium dihydrogen phosphate, evenly stirred and fully dissolved, and then sprayed on the mother plants fully until water is accumulated under leaf axils; and (2) after 15 days, a second spraying that is same as the first spraying is performed;

fifth step: promoting growth of offset seedlings of *Ananas comosus*, wherein, 20 days after completing the spraying in the step (2) in the fourth step, multiple offsets exposed under multiple leaf axils are seen, and the promoting growth of offset seedlings is conducted: (1) a 1000-fold solution prepared with 4% gibberellic acid emulsifiable concentrate is sprayed on the mother plants fully once, after 3 days, an aqueous solution is compounded by using a 100-fold water-soluble compound fertilizer at a N:P:K ratio of 20:10:15 and 1000-fold mineral potassium fulvate, and at a temperature less than 26° C. in an afternoon, 600 ml of the aqueous solution is poured from tops of the mother plants to ensure that water is accumulated under leaf axils; and (2) after 15 days, the aqueous solution is poured again by the above method; and after 45 days of culture, the mother plants produce 3-5 offset seedlings with a length of 20-30 cm required in planting, and the seedlings are harvested; and sixth step: after a seedling production and propagation in the second step to the fifth step and a consequent first seedling harvesting, implementing operations as follows: (1) the second step to the fifth step are repeated in a first round, so that another seedling production and propagation is performed for a second seedling harvesting, and a seedling yield of a single mother plant is multiplied for a first time; and then (2) the second step to the fifth step are repeated in a second round so that further another seedling production and propagation is performed for a third seedling harvesting.

\* \* \* \* \*